(12) United States Patent
Zhang

(10) Patent No.: US 6,275,492 B1
(45) Date of Patent: *Aug. 14, 2001

(54) METHOD AND APPARATUS FOR ROUTING DATA USING ROUTER IDENTIFICATION INFORMATION

(75) Inventor: Zhaohui Zhang, Billerica, MA (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,873

(22) Filed: Dec. 2, 1997

Related U.S. Application Data

(60) Provisional application No. 60/032,087, filed on Dec. 3, 1996.

(51) Int. Cl.[7] .................................................. H04L 12/56
(52) U.S. Cl. ............................................. 370/392; 370/400
(58) Field of Search ..................................... 370/389, 392, 370/397, 399, 409, 401, 238, 236, 351, 352, 400, 406, 407, 408; 709/239, 240, 241, 238

(56) References Cited

U.S. PATENT DOCUMENTS

| | | | |
|---|---|---|---|
| 5,675,741 | * 10/1997 | Aggarwal et al. | 395/200.15 |
| 5,881,246 | * 3/1999 | Crowley et al. | 395/200.68 |
| 5,917,820 | * 6/1999 | Rekhtov | 370/392 |
| 5,951,649 | * 8/1999 | Dobbins et al. | 709/238 |
| 5,987,521 | * 11/1999 | Arrowood et al. | 709/239 |
| 5,999,536 | * 12/1999 | Kawafuji et al. | 370/401 |
| 6,069,895 | * 5/2000 | Ayandeh | 370/399 |
| 6,078,963 | * 6/2000 | Civonlav et al. | . |

* cited by examiner

Primary Examiner—Douglas W. Olms
Assistant Examiner—Ken Vanderpuye
(74) Attorney, Agent, or Firm—Blakely Sokoloff Taylor & Zafman LLP

(57) ABSTRACT

A system for routing data through a network determines whether router identification information is associated with the data. The system then identifies a next hop router from a router table if router identification information is associated with the data. Otherwise, the system identifies a next hop router from a routing table if router identification information is not associated with the data. When identifying a next hop router from the router table, the system determines whether a match exists between entries in the router table and the router identification information. The system may set a switch tag in the data packet, in which the switch tag corresponds to a destination router identification. The router table used by the system contains information regarding how to reach all known routers.

29 Claims, 4 Drawing Sheets ically, the router determines the
METHOD AND APPARATUS FOR ROUTING DATA USING ROUTER IDENTIFICATION INFORMATION This appln claims the benefit of Prov. No. 60/032,087 filed Dec. 3, 1996.

BACKGROUND OF THE INVENTION

1. Field of the Invention

The present invention relates to systems for routing data through one or more networks. More specifically, the invention provides a system for routing data packets through a network using router identification information contained in the data packets.

2. Background

Data communication networks may include various nodes, routers, switches, hubs, and other network devices coupled to and communicating with one another. Data is communicated between network devices by utilizing one or more communication links between the devices. A particular data packet (or data cell) may be handled by multiple network devices and cross multiple communication links as it travels between its source and its destination. Additionally, multiple networks may be coupled to one another by common network devices or common links.

Various protocols may be used to communicate routing information through a network. One type of protocol is referred to as a link state protocol, in which each node in the network knows the network topology such that the node can calculate routes through the network using the known topology. The link state information is distributed to network nodes using a series of Link State Advertisements (LSAs) originated by routers and other nodes in the network. For example, a router may advertise LSAs into the network area in which the router resides. These advertised LSAs may indicate that the router has connections to one or more network nodes. These LSAs are received by other routers and nodes in the network. Thus, the other routers and nodes learn of the connections described in the advertised LSAs. All routers in the network may generate and advertise similar LSAs.

Since each router "learns" the network topology by receiving various LSAs, each router is capable of independently calculating routes through the network. Typically, when a router forwards a packet, the router determines the best "next hop" router by consulting a routing table maintained by the router. Known routing systems use the data packet's destination address as the lookup key in the routing table to determine the next hop router. Since the exact destination address may not be stored in the routing table, the router selects the closest match. This type of matching may be time consuming, especially if the routing table has a significant number of entries.

Another routing approach, referred to as "tag switching" (or "tag routing"), forwards data packets based on "tags" inserted into the data packet rather than based on a packet's destination address. The router then uses a "tag table" to lookup the tag. Each tag in the tag table is bound to a route. Each tag-route pair must be distributed to other nodes in the network before the "tag switching" system can be used. This binding of tags and routes, and the advertisement of the tag-route pairs may take additional time, thereby delaying the transmission of network data. Additionally, each change in a tag-route pair must be advertised to other nodes in the network.

It is therefore desirable to provide a system capable of performing tag switching, but that does not require the binding of tags and routes, and does not require the advertisement of the tag-route pairs to other nodes in the network.

SUMMARY OF THE INVENTION

Embodiments of the present invention provide a system for routing data packets through a network using router identification information contained in the data packets. The use of router identification information does not require the binding of a tag to a route and does not require the advertisement of tag-route pairs. Instead, the tag switching system of the present invention uses the router identification information as a tag when switching or routing packets.

An embodiment of the present invention provides a system for routing data through a network by determining whether router identification information is associated with the data. The system identifies a next hop router from a router table if router identification information is associated with the data. The system identifies a next hop router from a routing table if router identification information is not associated with the data.

Another embodiment of the invention determines whether a match exists between entries in the router table and the router identification information when identifying a next hop router from the router table.

In a particular embodiment of the invention, the data is contained in a data packet and the router identification information is contained in the data packet.

One embodiment of the invention provides a network device having a routing table, a router table, and a routing engine coupled to the routing table and the router table. The routing engine is configured to forward data toward a destination in response to router identification information associated with the data.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

The present invention is related to a system for routing data packets through a network using router identification information (router IDs) contained in the data packets. The use of router IDs does not require the binding of a tag to a route and does not require the advertisement of tag-route pairs to other nodes in the network. Instead, the present invention uses the router IDs as tags when switching or routing packets because link state routing protocols, such as the Open Shortest Path First (OSPF) protocol, already provide the binding and distribution. Therefore, no additional binding or distribution is needed.

The present invention may be used in various types of networks and network topologies, and may be used with various routing or switching protocols. A particular embodiment of the invention may be implemented in an OSPF environment. However, those of ordinary skill in the art will appreciate that the teachings of the present invention may also be applied to other network environments.

Figure 1:
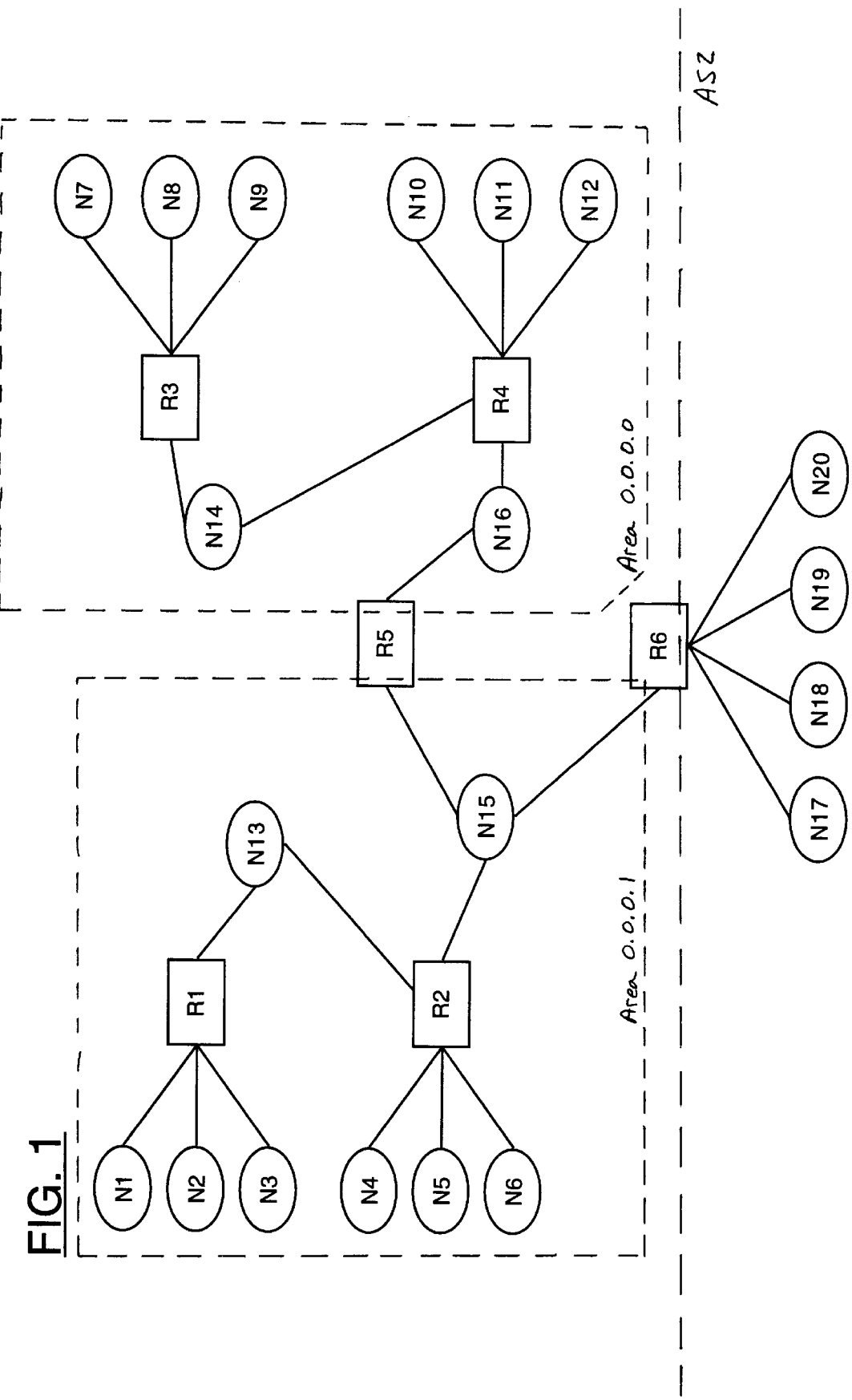
FIG. 1 illustrates an example network configuration containing multiple network devices arranged in multiple areas.

Referring to FIG. 1, an example network configuration is illustrated and contains multiple network devices arranged in multiple areas. In FIG. 1, network nodes are labeled N1–N20 and network routers are labeled R1–R6. The network configuration illustrates two domains (labeled AS1 and AS2). Domain AS2 includes router R6 and nodes N17–N20. Domain AS1 includes network areas 0.0.0.0 and 0.0.0.1, and routers R1–R6.

Using the link state routing techniques described above, each router in FIG. 1 generates Link State Advertisements (LSAs) and transmits the LSAs to other network devices in the router's network area. For example, router R1 advertises LSAs into area 0.0.0.1 to indicate that it has connections to nodes N1, N2, N3, and N13 in the area. Router R2 advertises LSAs into area 0.0.0.1 to indicate that it has connections to nodes N4, N5, N6, N13, and N15 in the area. Router R5 advertises LSAs to indicate that it has a connection to node N15 in area 0.0.0.1, and inter-area routes to nodes N7, N8, N9, N10, N11, N12, N14, and N16. Router R6 advertises LSAs into area 0.0.0.1 that it has a connection to N15 in the area, and it has inter-domain routes to nodes N17, N18, N19, and N20. Similarly, router R3 advertises LSAs into area 0.0.0.0 to indicate that it has connections to nodes N7, N8, N9, and N14 in the area. Router R4 advertises LSAs into area 0.0.0.0 to indicate that it has connections to nodes N10, N11, N12, N14, and N16 in the area.

Based on the information received in LSAs, each router calculates routes to various destinations (e.g., other network nodes or routers) in the network. Each router generates a routing table containing these destinations and the method for routing data to the destination. Table 1 below illustrates an example routing table for router R1 in FIG. 1.

TABLE 1

| Destination | Next Hop | Destination Router |
| --- | --- | --- |
| N1 | direct | R1 |
| N2 | direct | R1 |
| N3 | direct | R1 |
| N13 | direct | R1 |
| N4 | R2 | R2 |
| N5 | R2 | R2 |
| N6 | R2 | R2 |
| N15 | R2 | R2 |
| N7 | R2 | R5 |
| N8 | R2 | R5 |
| N9 | R2 | R5 |
| N10 | R2 | R5 |
| N11 | R2 | R5 |
| N12 | R2 | R5 |
| N14 | R2 | R5 |
| N16 | R2 | R5 |
| N17 | R2 | R6 |

TABLE 1-continued

| Destination | Next Hop | Destination Router |
| --- | --- | --- |
| N18 | R2 | R6 |
| N19 | R2 | R6 |
| N20 | R2 | R6 |

For example, Table 1 indicates that destination node N1 is directly reachable from router R1. Thus, if router R1 receives a data packet having a destination N1, the router forwards the packet directly to node N1. Similarly, if router R1 receives a data packet having a destination N6, router R1 forwards the packet to router R2 based on the next hop information provided in Table 1.

In addition to maintaining a routing table of routes to various destinations, each router maintains a routing table in each area for all Area Border Routers in the area, and another routing table for all domain boundary routers (ASBRs) in the routing domain. Additionally, routers may maintain a router table containing a list of all known routers.

As illustrated above, when a router forwards a packet, it uses its routing table to determine the next hop router using the packet's destination address. In the example of Table 1, when router R1 receives a packet addressed to node N17, router R1 uses its routing table to determine that the next hop is router R2. Router R1 then sends the packet to router R2. Router R2 then performs a similar lookup using its own routing-table and determines that router R6 is the next hop router. Router R6 then sends the packet directly to its destination, node N17.

When router R1 determines that router R2 is the next hop router, Table 1 also indicates that router R6 is responsible for sending the packet to destination node N17. Therefore, router R1 may insert the router ID of R6 into the packet as the switch tag. Thus, when router R2 receives the packet, R2 does not need to perform a lookup of its routing table because the tag already identifies router R6 as the destination router. Instead, router R2 uses a router table (e.g., a listing of all known routers) to determine how to reach router R6. For example, router R2 may use the tag R6 as the lookup key in the router table. Using its router table, R2 determines that router R6 is reachable through node N15. Accordingly, router R2 sends the packet to router R6 through node N15. When router R6 receives the packet, it determines that the tag R6 is itself and uses its own routing table to determine how to send the packet to node N17. At this point, the tag may be cleared since node N17 is in a different domain.

By eliminating the routing table lookup procedure at router R2, the router is able to forward the packet faster because the router table lookup is faster and requires fewer computational resources. The lookup of the router table is faster because the lookup identifies an exact match rather than the longest match used in routing table lookup. Additionally, the size of the router table is generally much smaller than the routing table, and fewer entries are searched during the lookup procedure.

As discussed above, other tag switching architectures require the binding together of routes and tags. These route-tag pairs are then advertised to other nodes in the network. In contrast, embodiments of the present invention utilize existing router IDs (e.g., OSPF router IDs). The binding and distribution of router IDs is performed automatically by the advertisement of LSAs and the route calculations based on the LSAs. Therefore, the binding and distribution of router IDs is an inherent part of the link state protocol and does not require the transmission or advertisement of additional information about the binding of tags and routes.

Referring again to FIG. 1, if router R1 receives a packet addressed to node N7, it determines from its routing table that the next hop router is R2 and that router R5 is responsible for sending the packet to node N7. Thus, router R1 establishes R5 as the tag and sends the packet to router R2 (the next hop router). Router R2 then performs a lookup of its router table using R5 as the key and determines that router R5 is reachable through node N15. Router R2 then sends the packet to router R5 through node N15. When router R5 receives the packet, it determines that the tag R5 is itself and uses its routing table to determine that router R3 is responsible for sending the packet to node N7. Router R5 then changes the tag from R5 to R3 and sends the packet to the next hop router, R4. Router R4 then uses its router table (with R3 as the lookup key) to determine that router R3 is reachable through node N14. Router R4 then sends the packet to router R3 through node N14. Router R3 determines that the tag R3 is itself and uses its routing table to determine how to send the packet to node N7. Router R3 then sends the packet to node N7, the packet's destination.

Figure 2:
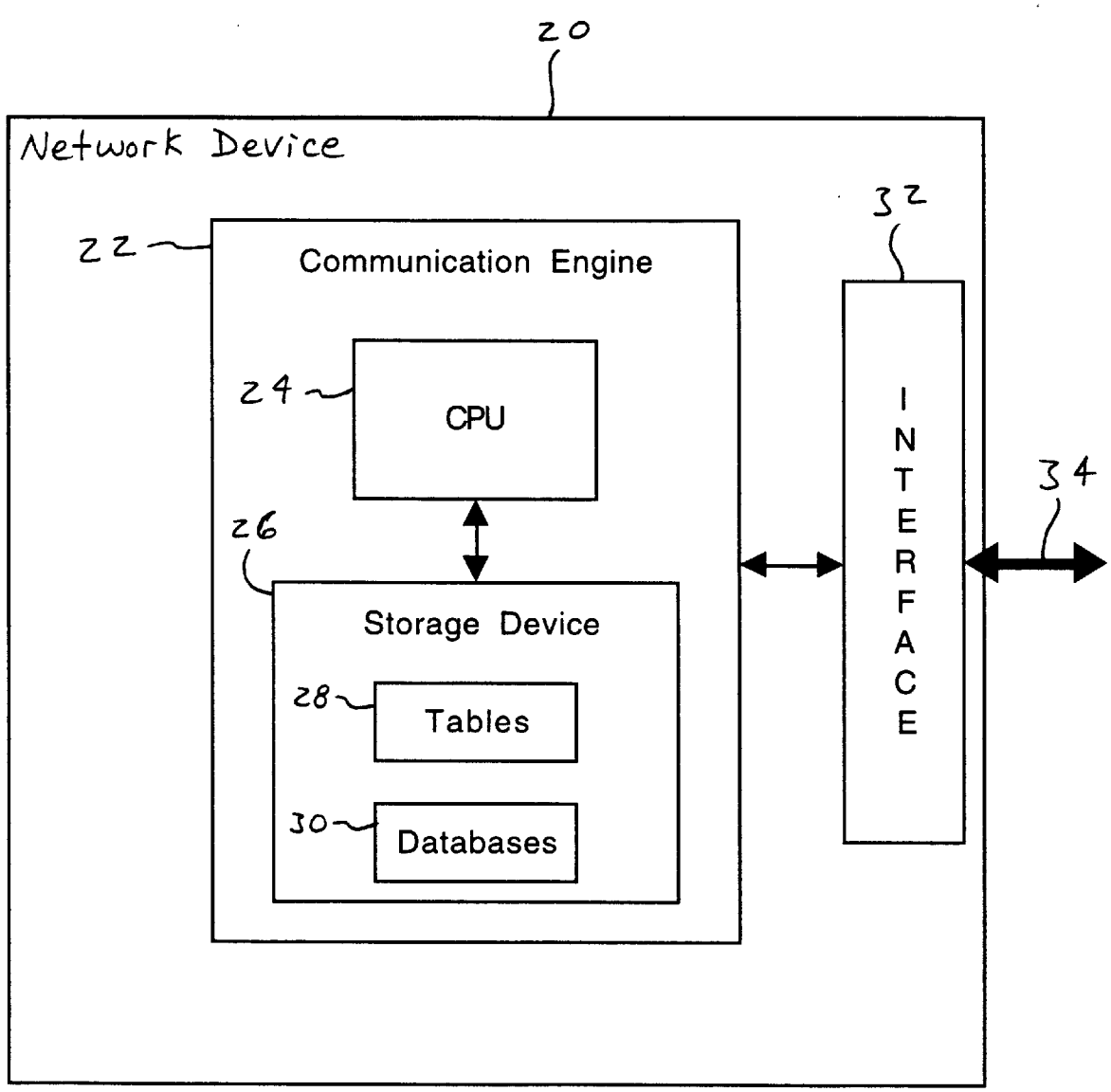
FIG. 2 illustrates a block diagram of a network device capable of implementing the teachings of the invention.

FIG. 2 illustrates a block diagram of a network device 20 capable of implementing the teachings of the present invention. Embodiments of network device 20 include a router, a switch, and other network devices. Network device 20 includes a communication engine 22 having a central processing unit (CPU) 24 and a storage device 26. Various types of CPUs may be used in the network device. Storage device 26 may be a memory, disk drive, or other mechanism capable of storing data. Communication engine 22 includes various tables 28 and databases 30 contained within the storage device. Tables 28 and databases 30 may include information necessary for network device 20 to properly transmit and receive data, and to identify routes through a network. Databases 30 may include a Link State Database and a Forwarding Database, as well as the other routing databases and tables, such as those discussed herein.

Communication engine 22 is capable of calculating paths through a network based on information contained in tables 28 and databases 30 An interface 32 is coupled to communication engine 22 and provides a physical connection to one or more network links 34. A single interface 32 and a single network link 34 are illustrated for clarity. However, a particular network device may have multiple interfaces coupled to multiple network links. In an embodiment of the invention, communication engine 22 is capable of performing the functions necessary to route data packets through a network using router identification information (router IDs) contained in the data packets. Those of ordinary skill in the art will appreciate that other types of network devices and communication devices may be used to implement the teachings of the invention.

Figure 3:
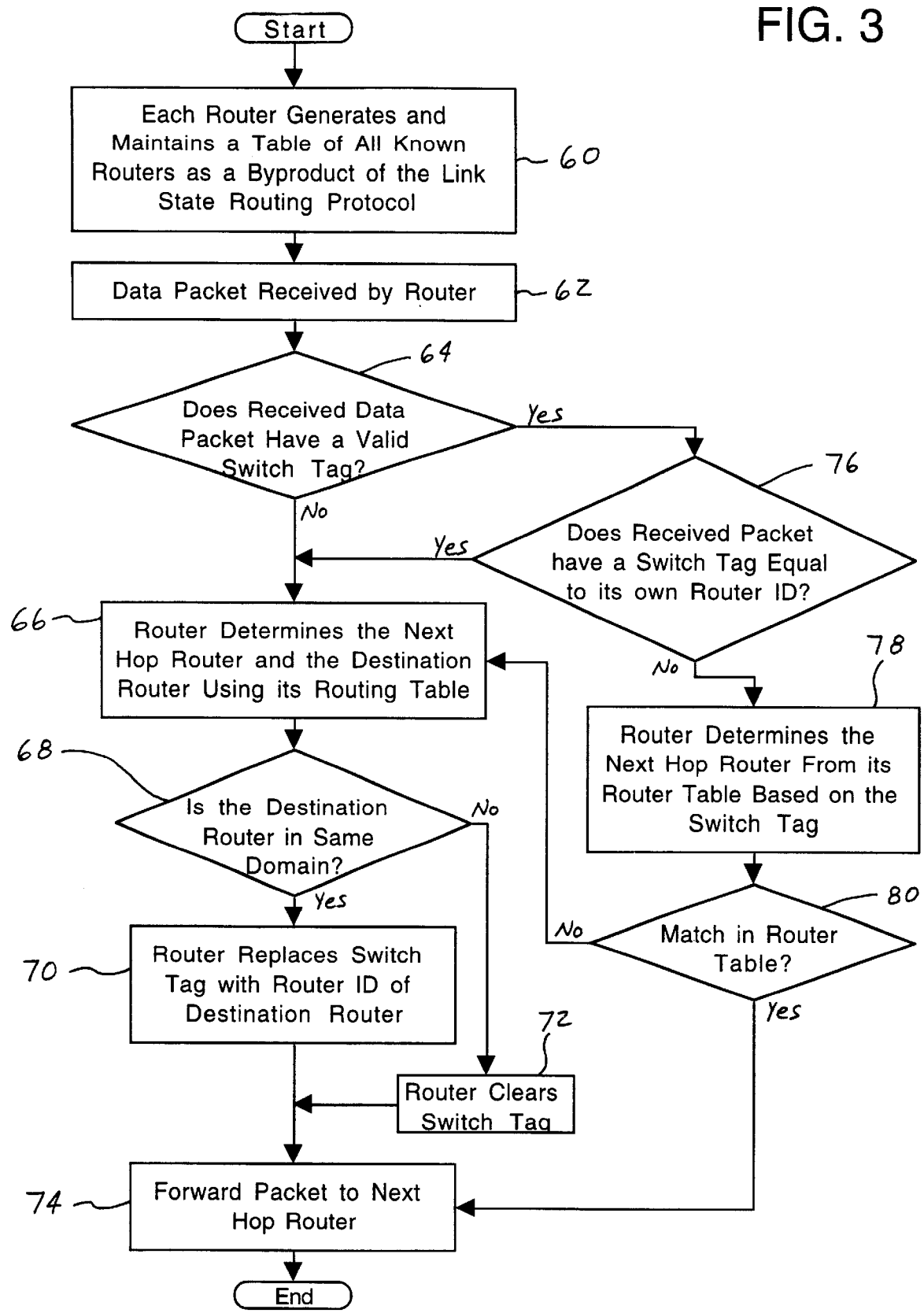
FIG. 3 is a flow diagram illustrating an embodiment of a procedure for routing data packets.

FIG. 3 is a flow diagram illustrating an embodiment of a procedure for routing data packets. At step 60, each router generates and maintains a table of all known routers. These tables are generated and maintained as a byproduct of the link state routing protocol. At step 62, a data packet is received by a particular router. Step 64 determines whether the received data packet has a valid switch tag. If the received data packet does not have a valid switch tag, the procedure continues to step 66, where the router determines the next hop router and the destination router using its routing table. At step 68, the procedure determines whether the destination router is in the same domain as the router performing the procedure. If the destination router is in a different domain, the procedure branches to step 72 to clear the switch tag, if any. Depending on the steps followed to reach step 70, the received data packet may or may not contain a switch tag. If the destination router is in the same domain, then step 68 continues to step 70, where the router replaces the switch tag, if any, with the router ID of the destination router. If the received data packet did not contain a switch tag, then step 70 adds (rather than replaces) a switch tag to the data packet. The procedure then continues to step 74 to forward the data packet to the next hop router.

If, in step 64, the received data packet has a valid switch tag, the procedure branches to step 76. Step 76 determines whether the received packet has a switch tag equal to its own router ID. If the switch tag is the same as the router's own ID, then the procedure branches to step 66 and continues as discussed above. If the switch tag is different from the router's own ID, then the procedure continues to step 78, where the router determines the next hop router from its router table based on the switch tag. Step 80 then determines whether a match was found for the switch tag in the router table. If no match was found in the router table, then the procedure branches to step 66 and continues as discussed above. Otherwise, the procedure continues from step 80 to step 74 to forward the packet to the next hop router.

Figure 4:
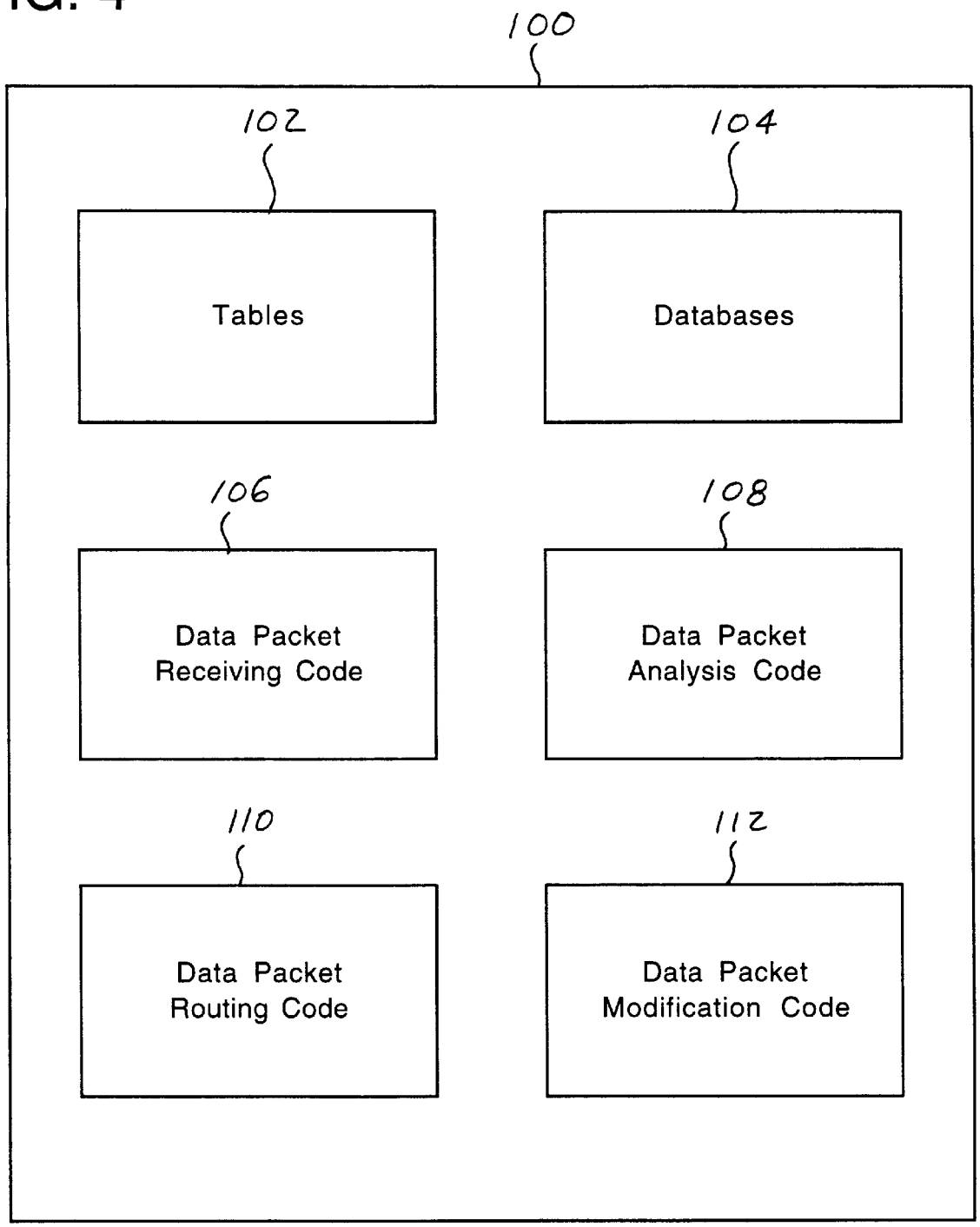
FIG. 4 illustrates an embodiment of a computer-readable medium containing various sets of instructions, code sequences, configuration information, and other data used by a processing device.

Embodiments of the invention may be represented as a software product stored on a computer-readable (or processor-readable) medium. For example, FIG. 4 illustrates an embodiment of a computer-readable medium 100 containing various sets of instructions, code sequences, configuration information, and other data used by a processing device. The embodiment illustrated in FIG. 4 is suitable for use with the system for routing data described above. The various information stored on medium 100 is used to perform various data handling and data routing operations. Computer-readable medium 100 is also referred to as a processor-readable medium. Computer-readable medium 100 can be any type of magnetic, optical, or electrical storage medium including a diskette, magnetic tape, CD-ROM, memory device (either volatile or non-volatile), or other storage medium.

Computer-readable medium 100 includes one or more tables 102, such as routing tables or router tables. In one embodiment of the invention, the tables are empty (i.e., contain null fields), but provide the data structure for storing various information. Computer-readable medium 100 also includes one or more databases 104. In certain embodiments of the invention, databases 104 are empty, but provide the data structure used during the data routing process. Data packet receiving code 106 receives data packets and other information from other network devices in the network. Data packet receiving code 106 may also retrieve a router ID or other information from a particular data packet. Data packet analysis code 108 is used to analyze router IDs and other information contained in a data packet.

Data packet routing code 110 determines the next hop router and/or the destination router for a data packet based on information contained in the data packet and information stored in tables 102 or databases 104. Data packet modification code 112 modifies packet data (e.g., adding or replacing switch tag information in a data packet that identifies the destination router associated with the data packet). Those of ordinary skill in the art will appreciate that additional instructions, code sequences, and information used to implement particular data routing systems can be stored on computer-readable medium 100. Additionally, in particular systems for routing data, one or more of the items illustrated in FIG. 4 may not be required.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method of routing data through a network, the method comprising:
   determining whether router identification information is associated with the data;
   identifying a next hop router from a router table if router identification information is associated with the data, the router table including all known routers; and
   identifying a next hop router from a routing table containing a destination and a route to the destination if router identification information is not associated with the data the routing table being generated by a router.

2. The method of claim 1 further comprising identifying a next hop router from the routing table if a next hop router cannot be identified from the router table using the router identification information.

3. The method of claim 1 further comprising setting a switch tag associated with the data, wherein the switch tag corresponds to a destination router identification.

4. The method of claim 1 wherein the router table contains information regarding how to reach all known routers.

5. The method of claim 1 wherein the routing table comprises information regarding a destination router capable of sending the data to a destination.

6. The method of claim 1 wherein the routing table comprises information regarding a destination router capable of sending the data to another network area.

7. The method of claim 1 wherein identifying the next hop router from the router table comprises determining whether a match exists between entries in the router table and the router identification information.

8. The method of claim 1 wherein the data is contained in a data packet and the router identification information is contained in the data packet.

9. The method of claim 1 wherein the method is performed by a network routing device.

10. The method of claim 1 wherein the method is performed by a switching system product.

11. The method of claim 1 wherein the method is performed by a transmission system product.

12. A router in a network comprising:
   a routing table containing a destination and a route to the destination, the routing table being generated by the router:
   a router table including all known routers; and
   a routing engine coupled to the routing table and the router table, the routing engine being configured to forward data toward the destination in response to router identification information associated with the data and to identify a next hop router from the router table if the router table and the data contain the router identification information.

13. A router in a network comprising:
   a routing table containing a destination and a route to the destination, the routing table being generated by the router;
   a router table including all known routers; and
   a routing engine coupled to the routing table and the router table, the routing engine being configured to forward data toward the destination in response to router identification information associated with the data and to identify a next hop router from the routing table if the data and the router table do not contain the router identification information.

14. A router of claim 12 wherein the router operates in a switching system product.

15. The router of claim 12 wherein the router operates in a transmission system product.

16. A routing apparatus comprising:
   means for determining whether router identification information is associated with data;
   means for identifying a next hop router from a router table if router identification information is associated with the data, wherein the router table includes all known routers; and
   means for identifying a next hop router from a routing table containing a destination and a route to the destination if router identification information is not associated with the data, the routing table being generated by the routing apparatus.

17. The routing apparatus of claim 16 further comprising means for identifying a next hop router from the routing table if the next hop router cannot be identified from the router table using the router identification information.

18. The routing apparatus of claim 16 further comprising means for setting a switch tag associated with the data, wherein the switch tag corresponds to a destination router identification.

19. The routing apparatus of claim 16 wherein the router table contains information regarding how to reach all known routers.

20. The routing apparatus of claim 16 wherein the routing table comprises information regarding a destination router capable of sending the data to another network area.

21. The routing apparatus of claim 16 wherein the apparatus is a switching system product.

22. The routing apparatus of claim 16 wherein the apparatus is a transmission system product.

23. A computer software product comprising a medium readable by a processor, the medium having stored thereon a sequence of instructions which, when executed by the processor, causes the processor to:
   determine whether router identification information is associated with received data;
   identify a next hop router from a router table if router identification information is associated with the received data; and identify a next hop router from a routing table containing a destination and a route to the destination if router identification information is not associated with the received data, the routing table being generated by a router.

24. The computer software product of claim 23 further comprising a sequence of instructions which, when executed by the processor, causes the processor to identify a next hop router from the routing table if a next hop router cannot be identified from the router table using the router identification information.

25. The computer software product of claim 23 further comprising a sequence of instructions which, when executed by the processor, causes the processor to set a switch tag associated with the data, wherein the switch tag corresponds to a destination router identification.

26. The computer software product of claim 23, wherein the router table contains information regarding how to reach all known routers.

27. The computer software product of claim 23 wherein the instructions are executed by a network routing device.

28. The computer software product of claim,23 wherein the instructions are executed by a switching system product.

29. The computer software product of claim 23 wherein the instructions are executed by a transmission system product.

* * * * *